(12) United States Patent
Paulov

(10) Patent No.: US 10,746,092 B2
(45) Date of Patent: Aug. 18, 2020

(54) BYPASS VALVE HAVING A FLAP SKIRT FOR AN EXHAUST-GAS TURBOCHARGER, AND EXHAUST-GAS TURBOCHARGER HAVING SUCH A BYPASS VALVE

(71) Applicant: CPT GROUP GMBH, Hannover (DE)

(72) Inventor: Mark Paulov, Dannstadt-Schauernheim (DE)

(73) Assignee: CPT Group GmbH, Hannover (DE)

( * ) Notice: Subject to any disclaimer, the term of this patent is extended or adjusted under 35 U.S.C. 154(b) by 0 days.

(21) Appl. No.: 16/324,137

(22) PCT Filed: Jul. 31, 2017

(86) PCT No.: PCT/EP2017/069339
§ 371 (c)(1),
(2) Date: Feb. 8, 2019

(87) PCT Pub. No.: WO2018/029027
PCT Pub. Date: Feb. 15, 2018

(65) Prior Publication Data
US 2019/0170060 A1 Jun. 6, 2019

(30) Foreign Application Priority Data
Aug. 10, 2016 (DE) ........................ 10 2016 214 843

(51) Int. Cl.
*F02B 37/18* (2006.01)
*F16K 1/20* (2006.01)
(Continued)

(52) U.S. Cl.
CPC .......... *F02B 37/183* (2013.01); *F16K 1/2014* (2013.01); *F16K 15/03* (2013.01); *F16K 25/04* (2013.01); *Y02T 10/144* (2013.01)

(58) Field of Classification Search
CPC ........ F16K 1/2014; F16K 15/03; F16K 25/04; Y02T 10/144; F05D 2220/40; F02B 37/183

See application file for complete search history.

(56) References Cited

U.S. PATENT DOCUMENTS

| 791,382 A | 5/1905 | Turro |
| 5,327,933 A * | 7/1994 | Ishikawa ................ B60K 15/04 |
| | | 137/527.6 |

(Continued)

FOREIGN PATENT DOCUMENTS

| DE | 29506395 U1 | 6/1995 |
| DE | 10020041 C2 | 5/2003 |

(Continued)

OTHER PUBLICATIONS

JP2008133736 Translation; Tabata Masakazu; Jun. 12, 2008.*

*Primary Examiner* — Jesse S Bogue
(74) *Attorney, Agent, or Firm* — Laurence A. Greenberg; Werner H. Stemer; Ralph E. Locher

(57) ABSTRACT

A bypass valve for an exhaust-gas turbocharger has a valve flap seat formed at one end of a bypass duct and a valve flap. The valve flap has, at the outer edge of the its closing surface, a flap skirt which, in the closed state of the bypass valve, extends from the closing surface predominantly in the direction of the valve seat axis beyond the valve flap seat and at least over a part of the valve flap outer circumference, such that the flap skirt at least partially surrounds the valve seat outer circumference of the valve flap seat and, in an overlap region, engages over the valve flap seat by the skirt height.

14 Claims, 6 Drawing Sheets

(51) Int. Cl.
*F16K 15/03* (2006.01)
*F16K 25/04* (2006.01)

(56) References Cited

U.S. PATENT DOCUMENTS

| | | | |
|---|---|---|---|
| 5,657,722 A * | 8/1997 | Hollis | F01P 7/167 |
| | | | 123/41.08 |
| 5,711,341 A * | 1/1998 | Funderburk | F16K 15/033 |
| | | | 137/454.6 |
| 6,035,638 A | 3/2000 | Lamsbach et al. | |
| 8,499,557 B2 | 8/2013 | Grabowska | |
| 9,145,825 B2 | 9/2015 | Kierat et al. | |
| 9,874,139 B2 * | 1/2018 | Marques | F02B 37/18 |
| 10,072,564 B2 | 9/2018 | Yasoshima et al. | |
| 10,273,873 B2 * | 4/2019 | Stilgenbauer | F02B 37/025 |
| 10,309,404 B2 * | 6/2019 | Stilgenbauer | F02B 37/183 |
| 2008/0258096 A1 * | 10/2008 | Hawkins | G05D 16/0688 |
| | | | 251/321 |
| 2011/0000209 A1 | 6/2011 | Boening et al. | |
| 2012/0312010 A1 | 12/2012 | Yasoshima | |
| 2015/0345375 A1 | 12/2015 | Grabowska | |

FOREIGN PATENT DOCUMENTS

| | | | |
|---|---|---|---|
| DE | 102008011416 A1 | 9/2009 | |
| DE | 102010007600 A1 | 8/2011 | |
| DE | 112009002230 T5 | 9/2011 | |
| DE | 112013005560 T5 | 8/2015 | |
| EP | 2469371 A1 | 6/2012 | |
| JP | H06058156 A | 3/1994 | |
| JP | 2008133736 A | 6/2008 | |
| JP | 2013213565 A | 10/2013 | |
| WO | 2015054180 A1 | 4/2015 | |
| WO | 2015097786 A1 | 7/2015 | |

* cited by examiner

BYPASS VALVE HAVING A FLAP SKIRT FOR AN EXHAUST-GAS TURBOCHARGER, AND EXHAUST-GAS TURBOCHARGER HAVING SUCH A BYPASS VALVE

BACKGROUND OF THE INVENTION

Field of the Invention

The invention relates to a bypass valve for an exhaust-gas turbocharger in particular for an internal combustion engine, which bypass valve is designed as a flap valve with a flap valve seat and with a valve flap which interacts with the valve flap seat, and to an exhaust-gas turbocharger whose turbine housing and/or whose compressor housing has a bypass valve with a valve flap and with a valve flap seat.

Exhaust-gas turbochargers are being increasingly used to increase power in motor-vehicle internal combustion engines. More and more frequently, this is done with the aim of reducing the overall size and weight of the internal combustion engine for the same power or even increased power and, at the same time, of reducing consumption and thus $CO_2$ emissions, with regard to ever stricter legal requirements in this respect. The principle of action consists in using the energy contained in the exhaust-gas flow to increase the pressure in the intake tract of the internal combustion engine and in this way to bring about better filling of the combustion chamber with atmospheric oxygen and thus enable more fuel, gasoline or diesel, to be converted in each combustion process, i.e. to increase the power of the internal combustion engine.

For this purpose, an exhaust-gas turbocharger has a turbine, which is arranged in the exhaust-gas tract of the internal combustion engine and which has a turbine impeller driven by the exhaust-gas flow, and a compressor, which is arranged in the intake tract and which has a compressor impeller which builds up the pressure. The turbine impeller and compressor impeller are fastened rotationally conjointly to the opposite ends of a rotor shaft which is rotatably mounted in a bearing unit arranged between turbine and compressor. Thus, by means of the exhaust-gas mass flow, the turbine wheel, and via the rotor shaft, in turn, the compressor impeller, are driven, and the exhaust-gas energy is thus utilized for building up pressure in the intake tract.

Turbines and compressors are turbomachines and have, on account of physical laws, an optimal operating range, dependent in each case on the overall size and design, which is characterized by the mass throughput, the pressure ratio and the rotational speed of the respective impeller.

In contrast thereto, the operation of an internal combustion engine in a motor vehicle is characterized by dynamic changes in the load and the operating range.

To now be able to adapt the operating range of the exhaust-gas turbocharger to changing operating ranges of the internal combustion engine and thus ensure a desired response characteristic as far as possible without noticeable decelerations (turbo lag), exhaust-gas turbochargers are equipped with so-called variable turbine geometries and with bypass ducts, provided for being opened by means of valve flaps, in the turbine housing and compressor housing.

A corresponding bypass-duct device on the turbine side is referred to as a wastegate valve. The wastegate valves connects the exhaust-gas duct upstream of the turbine impeller in a flow direction to the exhaust-gas duct downstream of the turbine impeller. The wastegate valve can be opened or closed by means of a closing device, for example a valve flap. In the presence of a low rotational speed but high load demand and the correspondingly small exhaust-gas mass flow of the internal combustion engine, the wastegate valve is closed, and the entirety of the exhaust-gas mass flow is conducted by the turbine impeller. This ensures an adequate rotational speed of the turbine and compressor impellers and thus an adequate pressure build-up by the compressor even in the presence of a low rotational speed of the internal combustion engine. In the presence of a high rotational speed and high load and correspondingly large exhaust-gas mass flow of the internal combustion engine, the wastegate valve is then opened, and at least a part of the exhaust-gas mass flow is conducted past the turbine impeller directly into the exhaust region downstream of the turbine impeller in the flow direction, in order to keep the rotational speed of the turbine and compressor impellers and the pressure ratio at the turbine and compressor within the desired working range of the exhaust-gas turbocharger.

A corresponding bypass-duct device on the compressor side is referred to as an overrun air recirculation valve. The overrun air recirculation valve connects the fresh-air intake duct upstream of the compressor impeller in the flow direction to the compressed-air duct downstream of the compressor impeller in the flow direction. In operating ranges of the internal combustion engine in which the internal combustion engine draws in and consumes such a quantity of compressed air that the compressor does not generate an excessively high positive pressure increase in the intake tract of the internal combustion engine, the overrun air recirculation valve remains closed. However, if the positive pressure in the intake tract of the internal combustion engine increases to too great an extent, which is the case for example if the throttle flap is abruptly closed in the presence of high rotational speed, there is the risk of so-called compressor surging occurring, which, owing to the associated vibrations, can have a damaging effect on the mechanism of the turbocharger, and which should therefore be avoided. In this case, the overrun air recirculation valve is opened, and the positive pressure in the intake tract of the internal combustion engine is dissipated by means of a return flow of compressed air from the compressed-air duct into the fresh-air intake duct of the exhaust-gas turbocharger.

FIG. 1 schematically shows an exhaust-gas turbocharger 1 of said type according to the prior art in a sectional illustration, which exhaust-gas turbocharger comprises an exhaust-gas turbine 20, a fresh-air compressor 30 and a rotor bearing 40. The exhaust-gas turbine 20 is equipped with a wastegate valve 29 and the exhaust-gas mass flow AM is indicated by arrows. The fresh-air compressor 30 has an overrun air recirculation valve 39 and the fresh-air mass flow FM is likewise indicated by arrows. The so-called turbocharger rotor 10 of the exhaust-gas turbocharger 1 is composed of the turbine impeller 12, the compressor impeller 13 and the rotor shaft 14. The turbocharger rotor 10 rotates about the rotor axis of rotation 15 of the rotor shaft 14 during operation. The rotor axis of rotation 15 and at the same time the turbocharger axis 2 coincide and are illustrated by the indicated centerline and identify the axial orientation of the exhaust-gas turbocharger 1. The turbocharger rotor 10 is supported with its rotor shaft 14 by means of two radial bearings 42 and one axial bearing washer 43. Both the radial bearings 42 and the axial bearing disk 43 are supplied with lubricant via oil supply ducts 44.

In a known manner, flap valves are used as a closing device for opening and closing the stated bypass valve devices, such as wastegate valves and overrun air recirculation valves. Said flap valves may be designed differently with regard to their actuation, as shown by way of example in FIG. 1. For example, the wastegate valve 29 is actuated in a linear reciprocating movement directly by an actuator 66 by means of a linearly actuated valve shank 65. Such an embodiment will hereafter also be referred to as linear flap valve. By contrast, in this case, the overrun air recirculation valve 39 is actuated for example in a rotational reciprocating movement by means of a corresponding crank mechanism (not illustrated) via a crank arm 60, wherein the valve flap 55 performs a pivoting movement about the crank spindle axis of rotation 62, wherein the valve flap 55 performs a reciprocating movement on a circular path. Such an embodiment will hereafter also be referred to as pivoting flap valve.

One example of a conventional pivoting flap valve, actuated via a crank arm 60, according to the prior art is illustrated in an enlarged view in FIG. 2, in a sectional illustration of a turbine housing 21 in the form of a wastegate valve 29 with a crank arm actuating device.

The exhaust-gas mass flow AM enters the turbine housing 21 of the exhaust-gas turbine via the exhaust-gas feed duct 23. From the turbine housing 21, the exhaust-gas mass flow AM is conducted to the turbine wheel (not illustrated) and then emerges through the exhaust-gas discharge duct 26 into the exhaust-gas system (not illustrated) and through the latter into the surroundings. The bypass duct 50, in this case a wastegate duct, now directly connects the exhaust-gas feed duct 23 to the exhaust-gas discharge duct 26. The valve flap seat 51 of the bypass duct 50 has a planar, ring-shaped valve seat surface 52. To close the bypass duct 53, a disk-shaped valve flap 55, in this case a wastegate flap, is set down onto the valve seat surface 52 of the valve flap seat 51. The valve flap 55 is fastened to a crank arm 60, which is mounted on a crank spindle 61 and which is thus mounted so as to be rotatable about the crank spindle axis of rotation 62. By means of rotation of the crank arm 60 about the crank spindle axis of rotation 62 (clockwise in the drawing), the valve flap 55 is set down onto the valve seat surface 52 from an approximately perpendicular direction along the valve flap path, and the bypass duct 50 is thus closed and, in the reverse direction, opened.

Such or similar designs of bypass valves are for example also disclosed in the documents DE 10 2008 011 416 A1, DE 10 2010 007 600 A1 and DE 100 20 041 C2.

Such flap valves have the disadvantage that the opening cross section of the valve passage, also referred to as valve opening cross section, increases very quickly with the opening stroke travel of the valve flap after the valve flap lifts off from the valve seat surface. This was hitherto not a problem because, in most situations, only the two maximum positions "open" or "closed" were provided during operation in any case. Ever more stringent legal regulations with regard to the exhaust-gas characteristics of internal combustion engines and increased demands with regard to the delay-free and harmonious power output of an internal combustion engine however increasingly require proportional, continuously variable control of the opening cross section of the bypass valves.

To ensure better open-loop or closed-loop control capability of a bypass valve, and opening cross section which increases continuously with an increasing opening stroke travel of the valve flap is desirable. To achieve this, the documents U.S. Pat. No. 6,035,638B2, DE112009002230T5 and US20120312010A1, for example, disclose a valve body which is arranged on the underside of the valve flap and which projects into the wastegate duct, which valve body, in accordance with its geometry, determines the opening cross section of the wastegate valve over the opening stroke travel of the valve flap.

These embodiments however have the disadvantage that the valve body of solid design increases the weight and thus the inertia and can lead to increased wear in the presence of excited vibrations of the valve flap.

SUMMARY OF THE INVENTION

The present invention is therefore based on the object of providing a bypass valve in particular for an exhaust-gas turbocharger, which bypass valve exhibits improved open-loop and closed-loop control capability and at the same time permits a high level of adjustment dynamics. A further objective consists in providing an exhaust-gas turbocharger which is improved with regard to the open-loop and closed-loop control capability and the adjustment dynamics of its bypass valves.

These objects are achieved by means of a bypass valve and an exhaust-gas turbocharger having the features according to the independent patent claims. Advantageous embodiments and refinements, which may be used individually or in combination with one another, form the subject matter of the dependent claims.

The bypass valve according to the invention, which is provided for use in an exhaust-gas turbocharger, in particular for an internal combustion engine of a motor vehicle, has a valve flap seat formed at one end of a bypass duct and has a valve flap. The valve flap seat is characterized by a valve seat surface, a valve seat axis perpendicular to said valve seat surface, and a valve seat outer circumference. Preferably, the valve seat outer circumference extends from the valve seat surface in the direction of the valve seat axis and thus forms a valve seat neck with a cylindrical or conical outer contour.

The valve flap has a valve flap outer circumference (59) and a closing surface which faces toward the valve flap seat and which interacts with the valve seat surface in order to open and close the bypass duct. Here, in the closed state of the bypass valve, the valve flap lies with its closing surface sealingly on the valve seat surface and, in the opened state of the bypass valve, said valve flap is lifted off from the valve seat surface, such that a valve opening cross section of the bypass duct is opened up, through which the respective fluid present in the bypass duct can flow out.

The bypass valve according to the invention is characterized in that, viewed in the closed state of the bypass valve, the closing surface of the valve flap, at least over a partial region of the valve flap outer circumference (59) and in its radial edge region in relation to the valve seat axis (53), projects in a radial direction beyond the valve seat outer circumference of the valve flap seat, wherein, at the outer edge of the closing surface of this partial region and outside the valve seat outer circumference of the valve flap seat, there is arranged a flap skirt which extends from the closing surface predominantly in the direction of the valve seat axis over an axial skirt height beyond the valve flap seat and at least over a part of the valve flap outer circumference. In this way, the flap skirt at least partially surrounds the valve seat outer circumference of the valve flap seat and, in an overlap region, engages over the valve flap seat in an axial direction by the skirt height.

The advantage of the bypass valve according to the invention lies in the fact that, by means of the flap skirts which engage around and over the valve flap seat, in particular at the start of the opening stroke travel of the valve flap, the valve opening cross section is increasingly opened up only slowly, that is to say is increasingly opened up more slowly over the opening stroke travel of the valve flap than would be the case without the flap skirt. This permits in particular finer setting and closed-loop control capability of the fluid flow to be discharged via the respective bypass valve.

In a further embodiment of the bypass valve, the flap skirt has a profile of the skirt height over the valve flap outer circumference and a spacing to the valve seat outer circumference which are configured and dimensioned such that, during the opening of the bypass valve, the flap skirt defines a valve opening cross section at least over a part of an opening stroke travel.

Here, the increase of the valve opening cross section, that is to say the increase characteristic or the opening characteristic of the bypass valve, is determined by means of the form of the flap skirt, that is to say the skirt height, the profile of the skirt height over the circumference of the valve flap, and the spacing of the flap skirt to the outer circumference of the valve seat outer circumference. Through the simple possible variation of these parameters independently of one another, it is possible for the opening characteristic of the bypass valve, at least over a part of the opening stroke travel of the valve flap, to be configured in virtually any desired manner and adapted to the operating requirements. It is thus for example possible for a valve opening cross section which increases linearly in continuous fashion over the opening stroke travel, or else a valve opening cross section which increases linearly or exponentially or abruptly in portions, to be realized.

The exhaust-gas turbocharger according to the invention has an exhaust-gas turbine and a fresh-air compressor, wherein the exhaust-gas turbocharger is characterized in that it has at least one bypass valve according to the invention as per the above description and in particular having features as per the exemplary embodiments described below.

Here, in particular, the exhaust-gas turbine of the exhaust-gas turbocharger may have a wastegate valve, or the fresh-air compressor may have an overrun air recirculation valve, or it is possible both for the exhaust-gas turbine to have a wastegate valve and for the fresh-air compressor to have an overrun air recirculation valve, wherein the wastegate valve or the overrun air recirculation valve, or both, are designed as a bypass valve according to the invention as per the description above and in particular having features as per the exemplary embodiments of the bypass valve described below.

The advantage of the exhaust-gas turbocharger according to the invention lies in the fact that it exhibits improved open-loop or closed-loop control capability of its bypass valves, and thus permits a more harmonious and at the same time more dynamic power delivery of the internal combustion engine in all rotational speed ranges.

Further exemplary embodiments of the invention will be explained in more detail hereinbelow on the basis of the illustrations in the drawing.

DESCRIPTION OF THE INVENTION

Parts of identical function and designation are denoted by the same reference signs throughout the figures.

Figure 1:
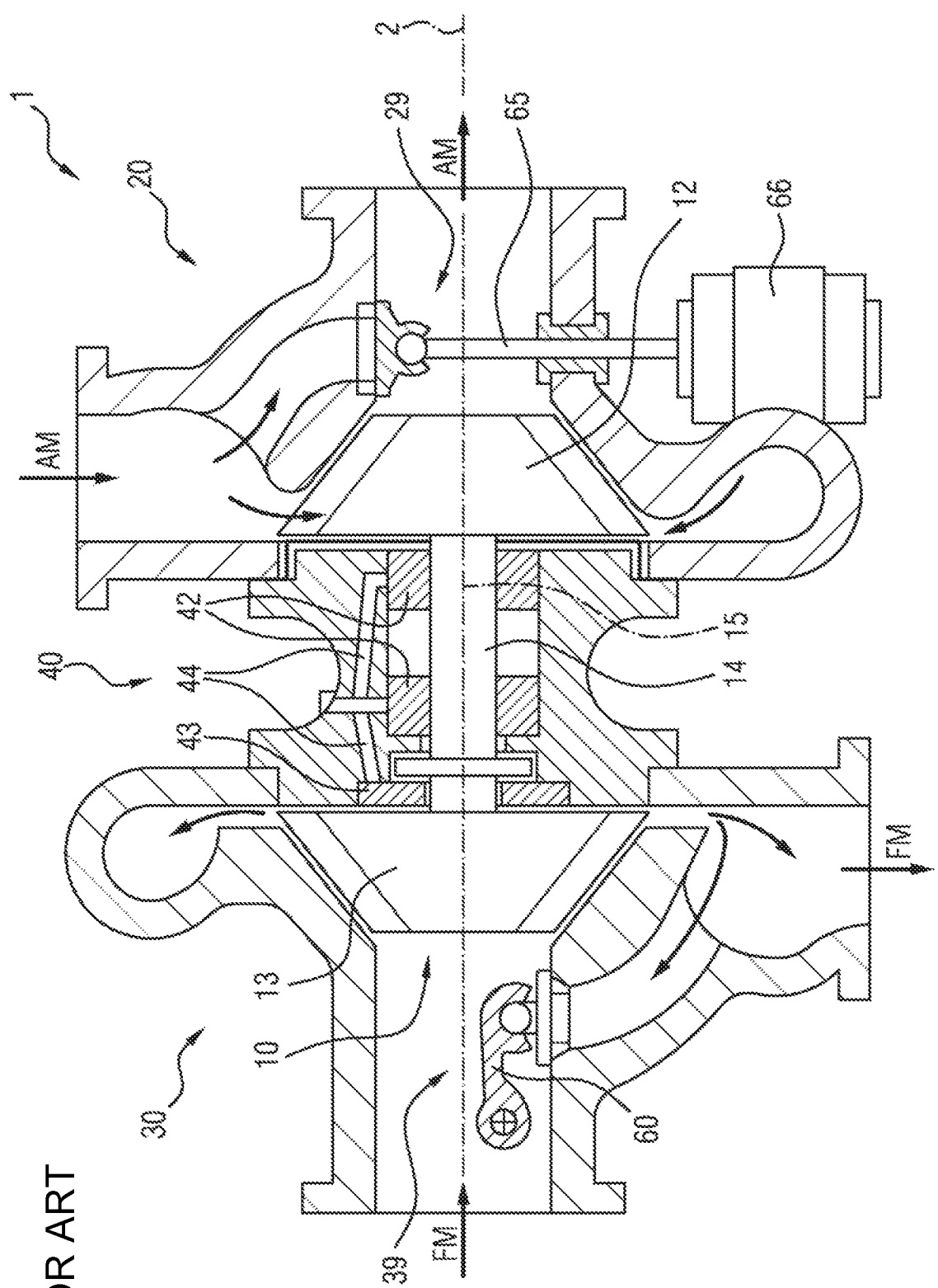
FIG. 1 shows an exhaust-gas turbocharger according to the prior art, having the main components, in a simplified schematic sectional illustration.
Figure 2:
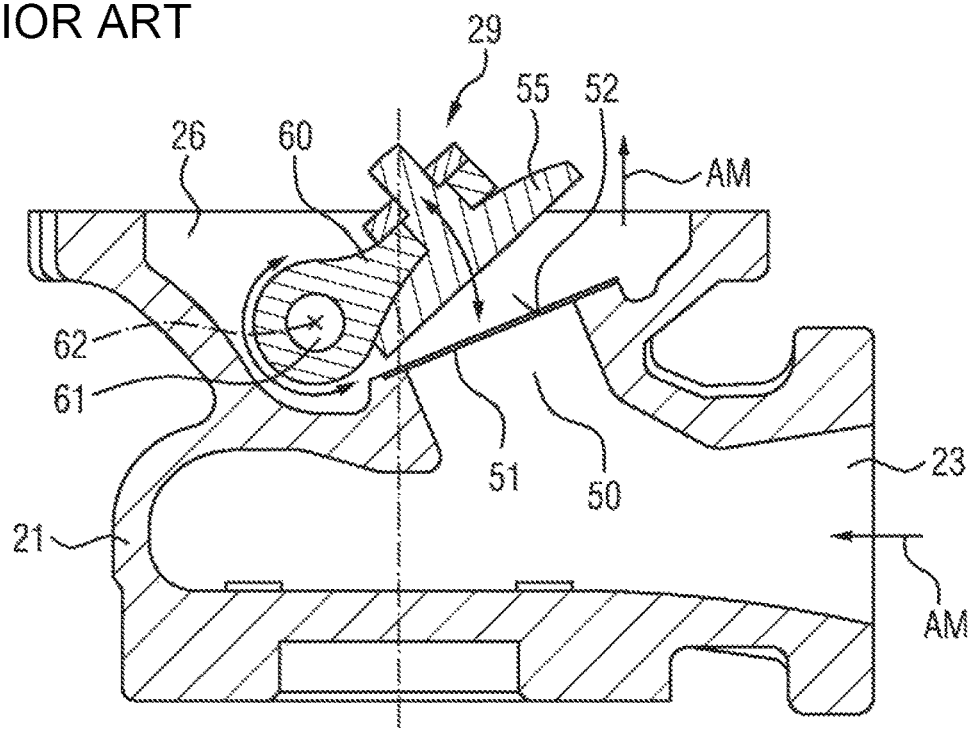
FIG. 2 shows a simplified sectional illustration of a turbine housing having a wastegate valve according to the prior art designed as a pivoting flap valve.

FIGS. 1 and 2 serve for the explanation of the prior art and have already been described in the introduction above in this context.

Figure 3:
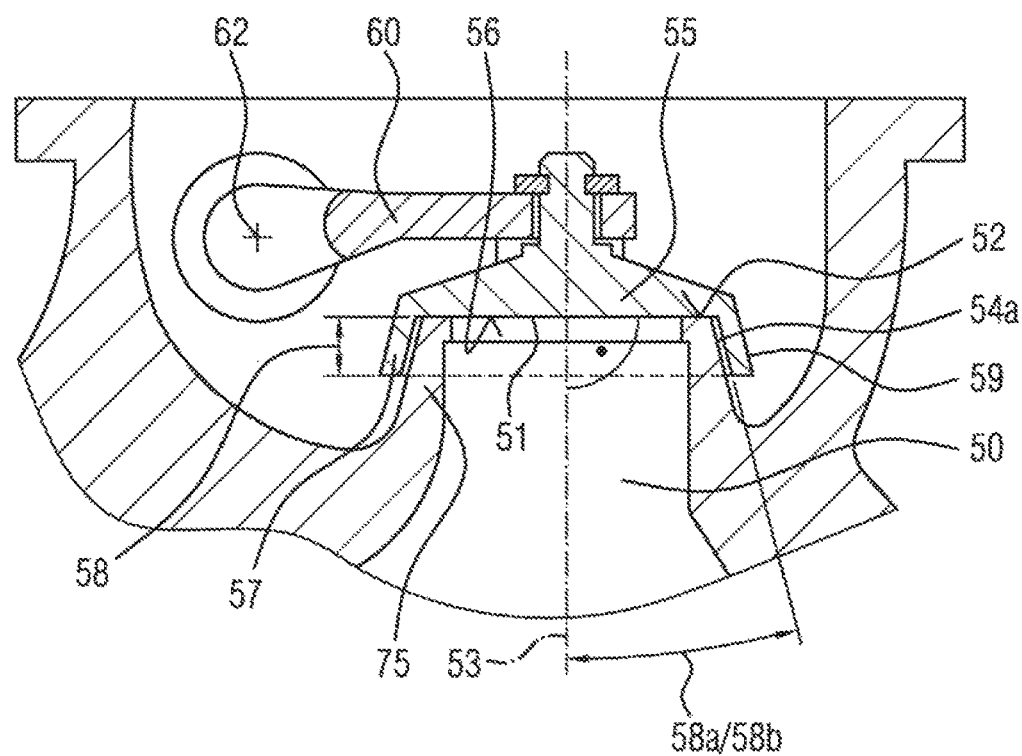
FIGS. 3 to 7 show in each case a simplified sectional illustration of a respective embodiment of a bypass valve according to the invention.

FIG. 3 shows, in a simplified sectional illustration, an advantageous embodiment of a bypass valve according to the invention, designed as a pivoting flap valve, in a closed state. Here, the valve flap 55 lies with its closing surface 56 sealingly on the valve seat surface 52 of the valve flap seat 51. The valve seat axis 53 is perpendicular to the valve seat surface 52 and is illustrated by a dash-dotted line. The valve flap 55 is arranged on a crank arm 60 and is pivoted by means of the latter about the crank spindle axis of rotation 62 from the open state into the closed state of the bypass valve, wherein the valve flap 55 moves on a circular path about the crank spindle axis of rotation.

The valve flap 55, in its radial edge region, projects in a radial direction beyond the valve seat outer circumference 54a of the valve flap seat 51. The valve seat outer circumference 54a extends from the valve seat surface 52 in the direction of the valve seat axis 53 and in the direction of the bypass duct 50 (downward in the figure), and thus forms a valve seat neck 75.

In this exemplary embodiment, the valve seat outer circumference 54a increases continuously with increasing spacing to the valve seat surface 52, whereby the valve seat neck 75 has a conical outer contour which forms a cone angle, referred to here as valve seat neck angle 58b, with respect to the valve seat axis 53. This has the effect that a valve opening cross section increases continuously with continuously progressing opening stroke travel of the valve flap 55.

At the radially outer edge of the closing surface 56 of the valve flap 55, and outside the valve seat outer circumference 54 of the valve flap seat 51, a flap skirt 57 is arranged on the valve flap 55. The flap skirt 57 extends from the closing surface 56 predominantly in the direction of the valve seat axis 53 over an axial skirt height 58 beyond the valve flap seat 51 and, in this embodiment, over the entire valve flap outer circumference 59. In this way, the flap skirt 57 fully encompasses the valve seat outer circumference 54a or the valve seat neck 75 of the valve flap seat 51 and, in this overlap region with the flap skirt 57, engages over the valve seat neck 75 by the skirt height 58.

The embodiment shown in FIG. 3 is furthermore characterized in that the flap skirt 57 extends at a skirt angle 58a with respect to the valve seat axis 53 (viewed in the closed state of the bypass valve), which is at any rate smaller than 45°, in the direction of the valve seat axis 53 and, in relation to the valve seat axis (53), radially outward beyond the valve flap seat 51. By virtue of the fact that the skirt angle 58a is smaller than 45°, the flap skirt 57 extends predominantly in the direction of the valve seat axis 53 and to a lesser extent in a radial direction. At the same time, here, the skirt angle 58a corresponds to the valve seat neck angle 58b. In another embodiment, the valve seat neck angle 58b and skirt angle 58a may by all means differ. In this embodiment, when the valve flap 55 lifts off from the valve flap seat 51, a ring-shaped gap is advantageously formed between the flap skirt 57 and the valve seat outer circumference 54a, which ring-shaped gap determines the valve opening cross section, wherein said valve opening cross section continuously increases only slowly with increasing opening stroke travel of the valve flap 55 for as long as the flap skirt 57 engages over the valve flap seat 51 or the flap skirt 57 overlaps the valve seat neck 75. In this overlap region, or in the corresponding part of the opening stroke travel of the valve flap 55, the valve opening cross section is determined primarily by the ring-shaped gap, and increases only slowly in a manner dependent on the valve seat neck angle 58b. Only after the overlap between flap skirt 57 and the valve flap seat 51 or the valve seat neck 75 has been eliminated beyond a certain opening stroke travel of the valve flap does the valve opening cross section abruptly increase further, to the point of complete opening of the bypass valve.

Furthermore, the conical shape of the valve seat neck 75 and the corresponding funnel shape of the encircling flap skirt 57 give rise to an advantageous centering action during the closing of the bypass valve, that is to say during the setting-down of the valve flap 55 onto the valve flap seat 51.

Figure 4:
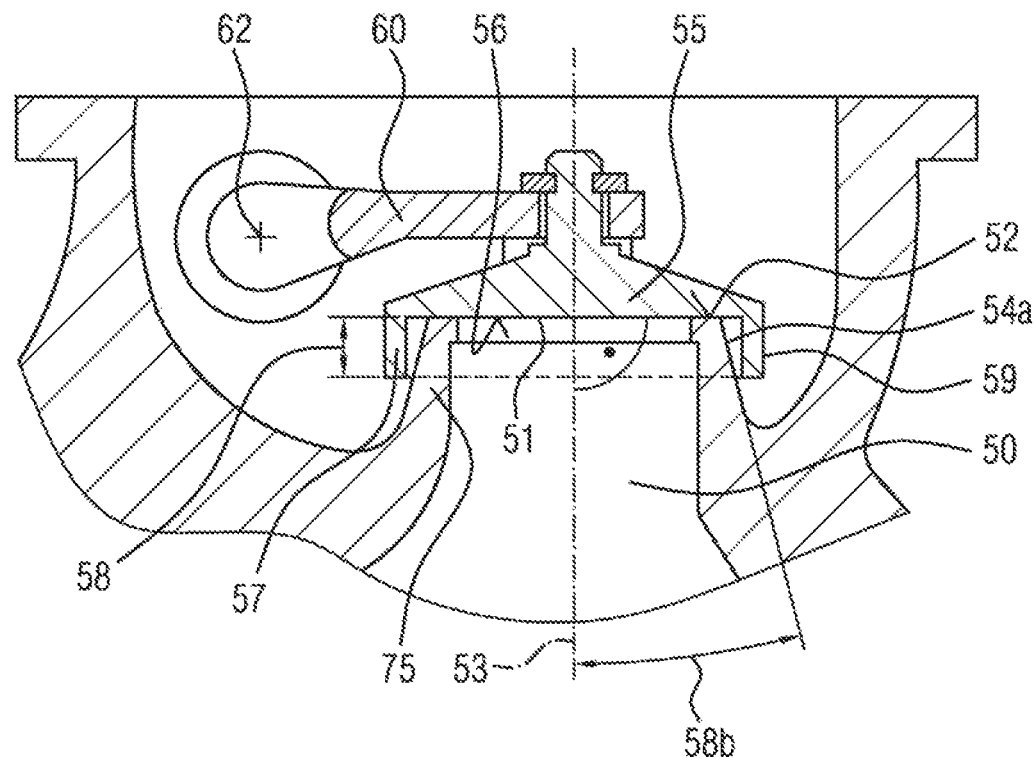

FIG. 4 shows a modification of the embodiment of the bypass valve according to the invention from FIG. 3. By contrast to the embodiment in FIG. 3, in this case only the valve flap skirt has an angle of 0°, that is to say extends exclusively in the direction of the valve seat axis 53 (viewed in the closed state of the bypass valve). This embodiment has the advantage of simpler production of the valve flap 55 in relation to the embodiment of FIG. 3. With regard to the opening characteristic of the valve opening cross section over the opening stroke travel of the valve flap 55, this embodiment exhibits a similar characteristic to the above-described embodiment of FIG. 3.

In a particular refinement of the embodiments, shown in FIGS. 3 and 4, of the bypass valve designed as a pivoting flap valve, the valve seat outer circumference 54a may be designed to increase in the overlap region of the flap skirt 57 such that, at least over a part of the opening stroke travel, a valve opening cross section increases continuously in linear fashion with continuously progressive opening stroke travel of the valve flap 55. Here, "continuously in linear fashion" means that, over the corresponding part of the opening stroke travel, the valve opening cross section becomes increasingly larger uniformly per unit of opening stroke travel.

Figure 5:
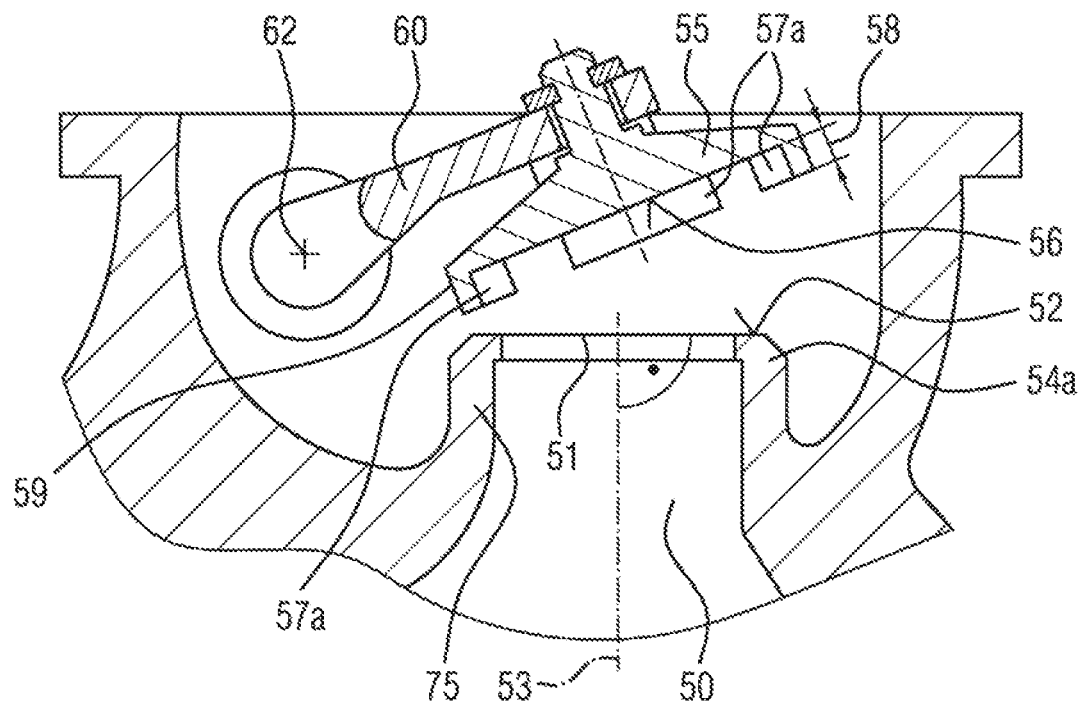

FIG. 5 shows a further embodiment of the bypass valve according to the invention, which is characterized in that the flap skirt 57 is composed of at least two flap skirt segments 57a which extend in each case over a part of the valve flap outer circumference 59.

The flap skirt may possibly also have only one flap skirt segment 57a or more than two flap skirt segments 57a arranged so as to be distributed over the valve flap outer circumference 59. Here, the individual flap skirt segments 57a may have in each case the same or else different flap skirt heights 58a. Also, by means of the positioning and dimensioning of the gaps between the individual flap skirt segments 57a, it is possible to influence the desired opening characteristic, that is to say the profile of the valve opening cross section in relation to the opening stroke travel of the valve flap.

In this case, four individual flap skirt segments 57a are arranged over the circumference of the valve flap at the outer edge of the closing surface. In this way, gaps are formed in the flap skirt 57 between the individual flap skirt segments 57a, which gaps enlarge the valve opening cross section at the start of the opening stroke travel of the valve flap.

In this embodiment, both the skirt angle 58a and the valve seat neck angle 58b are 0°, that is to say run approximately parallel to the valve seat outer circumference 54a and to the flap skirt 57 in the closed state of the bypass valve and at least in the presence of small opening stroke travels of the valve flap 55, and even run parallel to these over the entire opening stroke travel in the case of an embodiment as a linear flap valve. In this way, the ring-shaped gap between the valve seat outer circumference 54a and the flap skirt 57 or the flap skirt segments 57a can in this case be kept relatively small, and changes only little for as long as the flap skirt 57, during its opening stroke travel, still engages over or overlaps the valve seat neck 75. In this overlap region, the valve opening cross section is determined primarily by the gaps between the flap skirt segments, and increases slowly. Only after the overlap between flap skirt 57 and the valve flap seat 51 or the valve seat neck 75 has been eliminated beyond a certain opening stroke travel of the valve flap does the valve opening cross section abruptly increase further, to the point of complete opening of the bypass valve. The greater the fraction of the gaps in the flap skirt 57, the more the profile of the valve opening cross section of the opening stroke travel of the valve flap 55 approximates to the profile of a conventional flap valve without flap skirt 57. Also, by means of the position of the gaps, it is possible to at least initially predefine a certain direction for the outflowing exhaust-gas flow.

Figure 6:
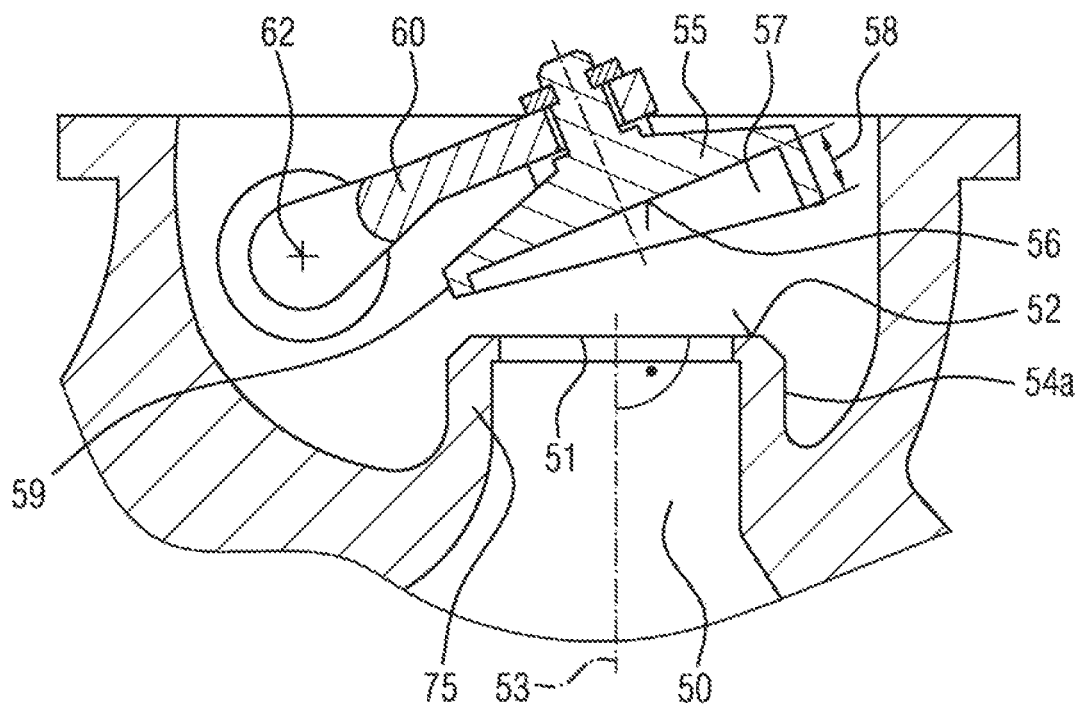

A further embodiment of the bypass valve according to the invention is illustrated in FIG. 6 and is distinguished by the fact that the skirt height 58 varies along the valve flap outer circumference 59. In this specific case, the flap skirt 57 has the smallest skirt height in the region facing toward the crank arm of the bypass valve designed as a pivoting flap valve, which skirt height increases continuously in both directions over the circumference of the valve flap as far as the opposite point on the circumference, with the greatest skirt height. The result is an, as it were, wedge-shaped profile of the flap skirt 57 from one point on the circumference of the valve flap 55 to a point situated opposite on the circumference. At the same time, the flap skirt 57 has a skirt angle of 0°, and the valve seat neck has a valve seat neck angle of likewise 0°.

In the case of this design of the flap skirt 57, the opening characteristic of the valve opening cross section over the opening stroke travel of the valve flap is very greatly dependent on the design of the bypass valve as a pivoting flap valve (illustrated here) or as a linear flap valve (not illustrated). In the case of the embodiment of the bypass valve as a pivoting flap valve, initially only a small valve opening cross section in the form of a ring-shaped gap between flap skirt 57 and valve seat outer circumference 54a is opened up, which opening cross section increases only very slightly over a first opening stroke travel range of the valve flap 55, for as long as the flap skirt 57 and valve seat neck 75 overlap. At a certain point of the opening stroke travel of the valve flap 55, the overlap of flap skirt 57 and valve flap seat 51 or valve seat neck 75 is then abruptly eliminated, whereby the valve opening cross section increases abruptly as the valve flap lifts off further from the valve flap seat.

In the case of an embodiment of the bypass valve as a linear flap valve, which is equipped with a valve flap 55 as shown in FIG. 6 and which performs a linear stroke movement, the overlap of flap skirt 57 and valve seat neck 75 is, at least over a first opening stroke travel range, slowly eliminated, and thus the valve opening cross section is slowly increasingly opened up, until the maximum valve opening cross section is reached.

Figure 7:
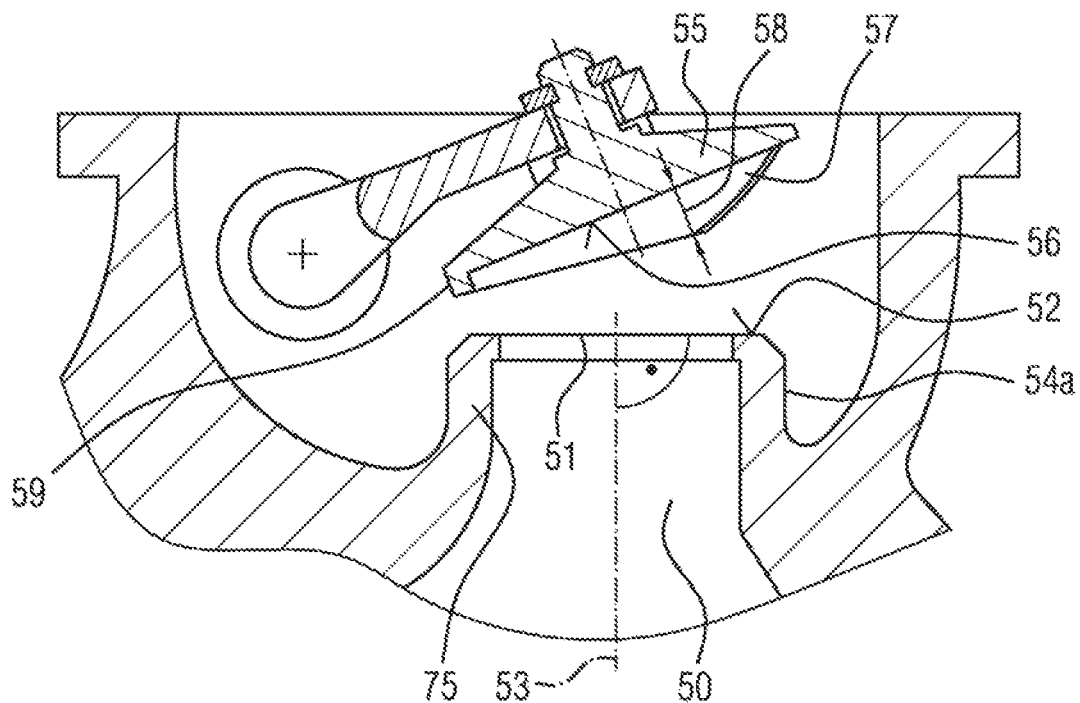

FIG. 7 shows a further exemplary embodiment of a bypass valve according to the invention, with a skirt height 58 of the encircling flap skirt 57 which varies over the circumference of the valve flap. As in the example illustrated in FIG. 6, it is also the case here that the skirt angle and the valve seat neck angle are each 0°. In this example, too, the flap skirt 57 has the smallest skirt height 58 in the region facing toward the crank arm 60, which skirt height initially increases continuously in both directions over the circumference of the valve flap as far as beyond the halfway point of the circumference of the valve flap 55, before then decreasing again to zero at the point situated opposite on the circumference. In this embodiment, the result is a profile of the valve opening cross section over the opening stroke travel of the valve flap 55 which, from the start of the stroke movement, that is to say immediately after the lift-off of the closing surface 56 from the valve seat surface 52, increases continuously as far as a point of the opening stroke travel of the valve flap 55 at which, then, the overlap of flap skirt 57 and valve flap seat 51 or valve seat neck 75 is abruptly eliminated, whereby the valve opening cross section increases abruptly as the valve flap lifts off further from the valve flap seat.

In a particular refinement of the embodiments, shown in FIGS. 6 and 7, of a bypass valve designed as a pivoting flap valve, the skirt height 58 may be varied along the valve flap outer circumference 59 such that, at least over a part of the opening stroke travel, a valve opening cross section increases continuously in linear fashion with continuously progressive opening stroke travel of the valve flap 55. Here, "continuously in linear fashion" means that, over the corresponding part of the opening stroke travel, the valve opening cross section becomes increasingly larger uniformly per unit of opening stroke travel.

Figure 8:
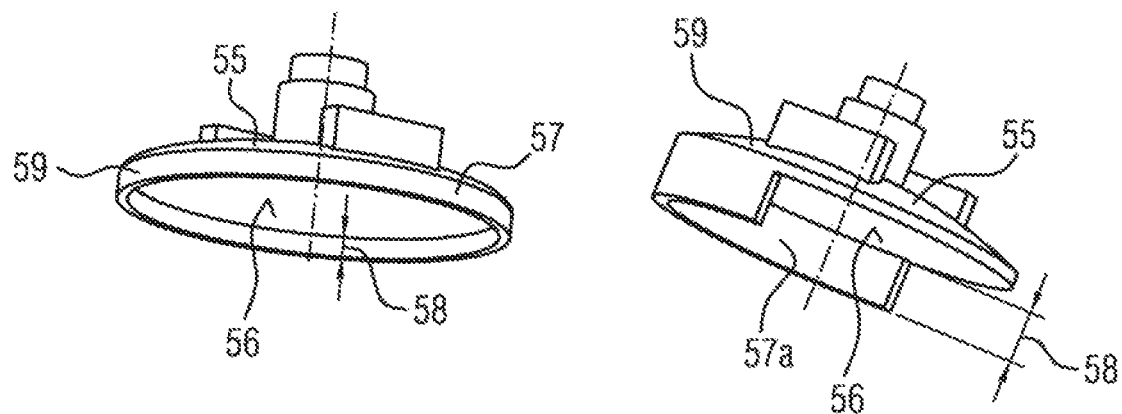
FIG. 8 shows in each case one perspective illustration of two embodiments of a valve flap of a bypass valve according to the invention.

FIG. 8 shows two further examples for the design of the valve flap 55 of a bypass valve according to the invention in an isolated perspective illustration, in order to provide the viewer with a three-dimensional view of the valve flap 55. Here, the left-hand example shows a valve flap 55 with a flap skirt 57 which runs in encircling fashion over the entire valve flap outer circumference 59 at the outer edge of the closing surface 56 and which has a constant skirt height 58. By contrast, the right-hand example shows a valve flap 55 with only one flap skirt segment 57a, which runs around only half of the valve flap outer circumference 59.

The description of the exemplary embodiments illustrated in FIGS. 3 to 8 makes it clear that, irrespective of the embodiment of the bypass valve as a pivoting flap valve or as a linear flap valve, it is possible through the use of the various illustrated features of the valve flaps 55, individually or in combination with one another and in interaction with the respective valve seat neck 75, for the profile of the valve opening cross section over the opening stroke travel of the valve flap to be configured in virtually any desired manner and in accordance with requirements.

In this way, it is possible to provide a bypass valve which is characterized in that the skirt height 58 is varied along the valve flap outer circumference 59 in such a way, and/or the skirt angle 58a is selected in such a way, and/or the valve seat neck angle 58b is selected in such a way, or the valve seat outer circumference 54a in the overlap region of the flap skirt 57 increases from the valve seat surface 52 in the direction of the valve seat axis 53 in such a way, that, at least over a part of the opening stroke travel, a valve opening cross section increases in continuous fashion or even linearly in continuous fashion with continuously progressive opening stroke travel of the valve flap 55.

Figure 9:
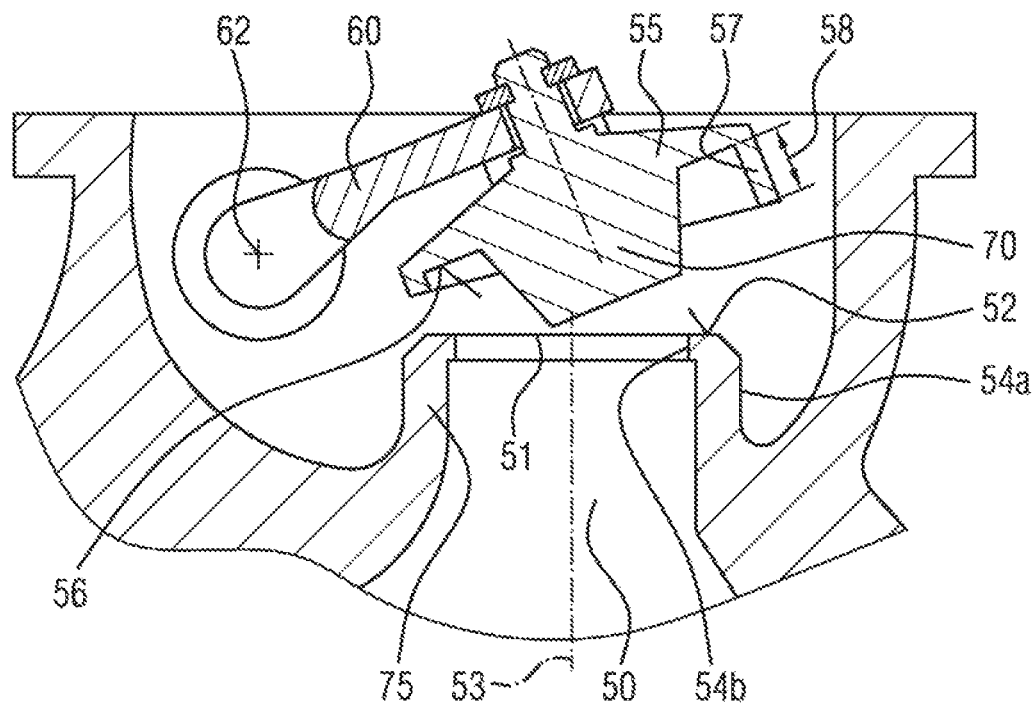
FIG. 9 shows a simplified sectional illustration of a further embodiment of a bypass valve according to the invention with an additional valve body.

FIG. 9 shows a further exemplary embodiment of a bypass valve according to the invention which is characterized in that, in addition to the flap skirt 57, a valve body 70 is arranged on the closing surface 56 of the valve flap 55 and within a valve seat inner circumference 54b, which valve body extends in the direction of the valve seat axis 53 through the valve flap seat 51 into the bypass duct. Such an embodiment permits the additional influencing of the valve opening cross section over the opening stroke travel of the valve flap 55 by restriction of the outlet cross section of the bypass duct 50 in the region of the valve flap seat 51. As a result of the valve body 70 protruding into the bypass duct 50, a gap, for example a ring-shaped gap, is formed between the valve seat inner circumference 54b and the outer circumference of the valve body 70, which gap jointly determines the valve opening cross section. For example, with corresponding design of the valve body 70, it can be achieved that, in an opening stroke travel range in which the overlap of the flap skirt 57 with the valve seat neck 75 has already been eliminated, the valve opening cross section continues to be determined by the valve body 70. It is thus possible for the opening stroke travel range in which a slowly continuously progressive enlargement of the valve opening cross section is ensured to be increased.

It is self-evident to a person skilled in the art that the various individual features of the exemplary embodiments illustrated in FIGS. 3 to 9 may be used in each case individually, or else in a combination of multiple individual features with one another unless they are mutually exclusive alternatives, in order to realize a bypass valve according to the invention.

Figure 10:
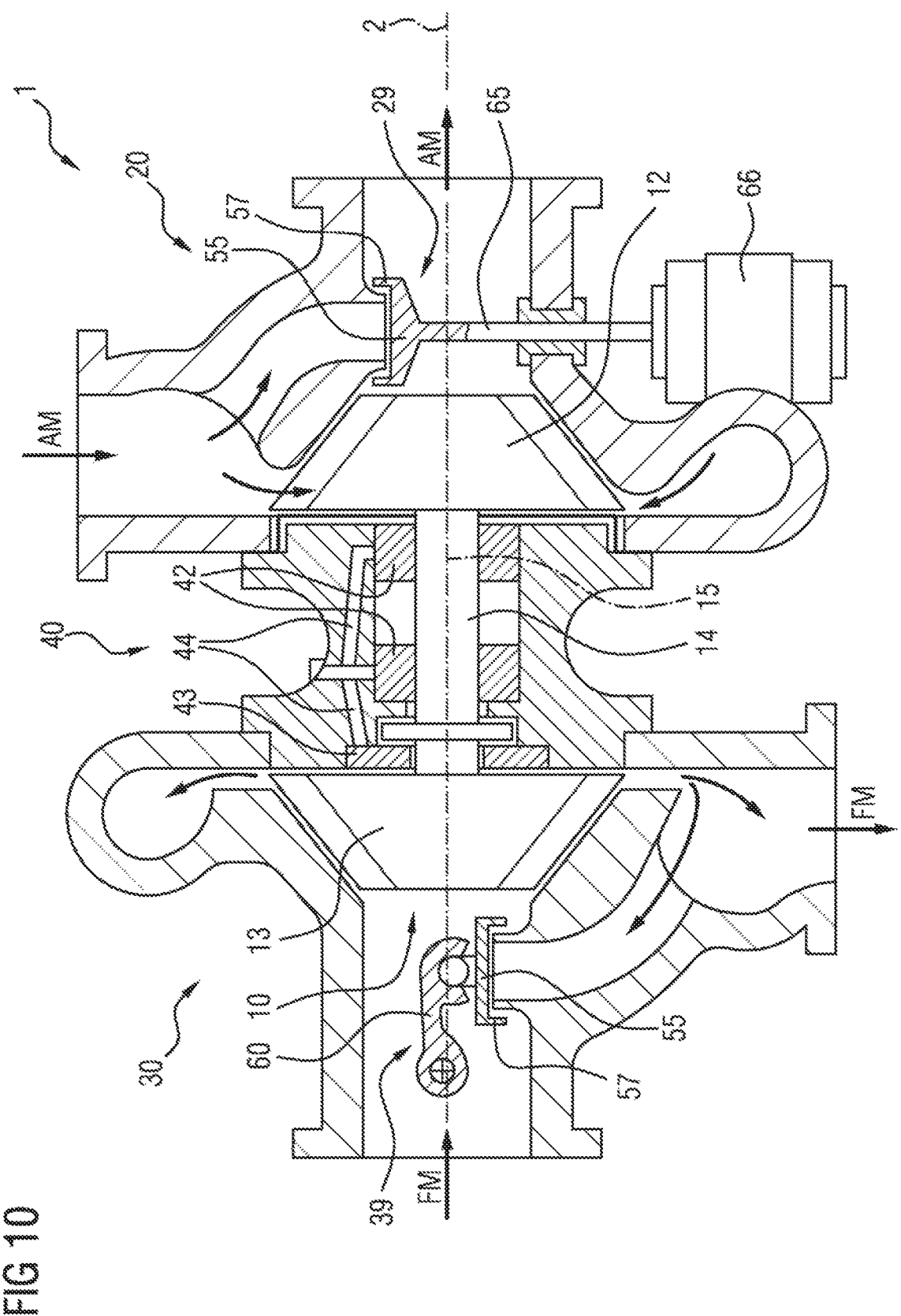
FIG. 10 shows an exhaust-gas turbocharger according to the invention, with two bypass valves according to the invention, in a simplified schematic sectional illustration.

An exhaust-gas turbocharger 1 according to the invention is illustrated in schematically simplified form in FIG. 10. Said exhaust-gas turbocharger substantially corresponds to the exhaust-gas turbocharger shown in FIG. 1, for which reason a repeated detailed description of all of the components will not be given here. The illustrated exhaust-gas turbocharger 1 has an exhaust-gas turbine 20 and a fresh-air compressor 30, wherein the exhaust-gas turbocharger 1 has at least one bypass valve 29, 39 with the features of one of the above exemplary embodiments of the bypass valve according to the invention with a respective flap skirt 57. In particular, in this exemplary embodiment, the exhaust-gas turbine 20 has a wastegate valve 29 and the fresh-air compressor 30 has an overrun air recirculation valve 39, wherein the wastegate valve 29 and the overrun air recirculation valve 39 are designed as a bypass valve having the features of one of the abovementioned exemplary embodiments of the bypass valve according to the invention. Furthermore, the overrun air recirculation valve 39 is designed as a pivoting flap valve with a crank arm 60, whereas the wastegate valve 29 is designed as a linear flap valve with a valve shank 65. The exhaust-gas turbocharger according to the invention is self-evidently not restricted to the exemplary embodiment shown in FIG. 10, but rather may also be equipped for example with only one bypass valve according to the invention in the exhaust-gas turbine 20 or in the fresh-air compressor 30. Likewise, a person skilled in the art is free to design the respective bypass valve according to the invention as a pivoting flap valve or as a linear flap valve.

The exhaust-gas turbocharger according to the invention may particularly advantageously be combined with an internal combustion engine of a motor vehicle, where it ensures a harmonious but at the same time dynamic response characteristic of the internal combustion engine and thus a comfortable driving characteristic of the motor vehicle.

The invention claimed is:

1. A bypass valve for an exhaust-gas turbocharger, the bypass valve comprising:
    a valve flap seat formed at one end of a bypass duct, said valve flap seat having a valve seat surface, a valve seat axis perpendicular to said valve seat surface, and a valve seat outer circumference;
    a valve flap having a valve flap outer circumference and a closing surface facing toward said valve flap seat, said closing surface interacting with said valve seat surface in order to open and close the bypass duct, wherein, in a closed state of the bypass valve, said closing surface of said valve flap lies on said valve seat surface, wherein in the closed state of the bypass valve, said closing surface, at least over a partial region of said valve flap outer circumference and in its radial edge region in relation to the valve seat axis, projects in a radial direction beyond said valve seat outer circumference of said valve flap seat; and
    a flap skirt, at an outer edge of said closing surface of the partial region and outside said valve seat outer circumference of said valve flap seat, there is disposed said flap skirt which extends from said closing surface predominantly in a direction of the valve seat axis over an axial skirt height beyond said valve flap seat and at least over a part of said valve flap outer circumference, such that said flap skirt at least partially surrounds said valve seat outer circumference of said valve flap seat and, in an overlap region, engages over said valve flap seat in an axial direction by the axial skirt height;
    said flap skirt including at least two flap skirt segments each extending over a part of said valve flap outer circumference, or said flap skirt extending completely over said valve flap outer circumference.

2. The bypass valve according to claim 1, wherein said flap skirt has a profile of the axial skirt height over said valve flap outer circumference and a spacing to said valve seat outer circumference which are configured and dimensioned such that, during an opening of the bypass valve, said flap skirt defines a valve opening cross section at least over a part of an opening stroke travel.

3. The bypass valve according to claim 2, wherein the axial skirt height varies along said valve flap outer circumference.

4. The bypass valve according to claim 1, wherein said flap skirt includes said at least two flap skirt segments each extending over a part of said valve flap outer circumference.

5. The bypass valve according to claim 1, wherein said flap skirt extends at a skirt angle of less than 45° with respect to the valve seat axis in a direction of the valve seat axis and, in relation to the valve seat axis, radially outward beyond said valve flap seat.

6. The bypass valve according to claim 1, wherein the bypass valve is a pivoting flap valve, and the axial skirt height varies along said valve flap outer circumference such that, at least over a part of an opening stroke travel, a valve opening cross section increases continuously in a linear fashion with continuously progressive opening stroke travel of said valve flap.

7. The bypass valve according to claim 1, wherein said valve seat outer circumference increases, proceeding from said valve seat surface in a direction of the valve seat axis, in the overlap region of said axial flap skirt.

8. The bypass valve according to claim 7, wherein the bypass valve is configured as a pivoting flap valve, and said valve seat outer circumference increases in the overlap region of said flap skirt such that, at least over a part of an opening stroke travel, a valve opening cross section increases continuously in a linear fashion with a continuously progressive opening stroke travel of said valve flap.

9. The bypass valve according to claim 1, further comprising a valve body disposed on said closing surface of said valve flap and within a valve seat inner circumference, said valve body extending in a direction of the valve seat axis through said valve flap seat into the bypass duct.

10. The bypass valve according to claim 1, wherein said flap skirt extends completely over said valve flap outer circumference.

11. An exhaust-gas turbocharger, comprising:
    an exhaust-gas turbine;
    a fresh-air compressor;
    a bypass duct; and
    at least one bypass valve, containing:
        a valve flap seat formed at one end of said bypass duct, said valve flap seat having a valve seat surface, a valve seat axis perpendicular to said valve seat surface, and a valve seat outer circumference;
        a valve flap having a valve flap outer circumference and a closing surface facing toward said valve flap seat, said closing surface interacting with said valve seat surface in order to open and close said bypass duct, wherein, in a closed state of said bypass valve, said closing surface of said valve flap lies on said valve seat surface, wherein in the closed state of said bypass valve, said closing surface, at least over a partial region of said valve flap outer circumference and in its radial edge region in relation to the valve seat axis, projects in a radial direction beyond said valve seat outer circumference of said valve flap seat; and
        a flap skirt, at said outer edge of said closing surface of the partial region and outside said valve seat outer circumference of said valve flap seat, there is disposed said flap skirt which extends from said closing surface predominantly in a direction of the valve seat axis over an axial skirt height beyond said valve flap seat and at least over a part of said valve flap outer circumference, such that said flap skirt at least partially surrounds said valve seat outer circumference of said valve flap seat and, in an overlap region, engages over said valve flap seat in an axial direction by the axial skirt height;
        said flap skirt including at least two flap skirt segments each extending over a part of said valve flap outer circumference, or said flap skirt extending completely over said valve flap outer circumference.

12. The exhaust-gas turbocharger according to claim 11, wherein said exhaust-gas turbine has a wastegate valve and/or said fresh-air compressor has an overrun air recirculation valve, wherein said wastegate valve and/or said overrun air recirculation valve is said bypass valve.

13. The exhaust-gas turbocharger according to claim 11, wherein said flap skirt includes said at least two flap skirt segments each extending over a part of said valve flap outer circumference.

14. The exhaust-gas turbocharger according to claim 11, wherein said flap skirt extends completely over said valve flap outer circumference.

* * * * *